United States Patent [19]
Ayanoglu et al.

[11] Patent Number: 6,014,385
[45] Date of Patent: Jan. 11, 2000

[54] METHOD AND APPARATUS FOR TRANSMITTING PACKETIZED DATA OVER A COMMON COMMUNICATIONS CHANNEL

[75] Inventors: Ender Ayanoglu, Red Bank; Kai Yin Eng, Middletown; Mark John Karol, Fair Haven, all of N.J.

[73] Assignee: Lucent Technologies, Inc., Murray Hill, N.J.

[21] Appl. No.: 08/781,968

[22] Filed: Dec. 28, 1996

[51] Int. Cl.[7] ............................................. H04J 3/16
[52] U.S. Cl. .................................. 370/458; 370/468
[58] Field of Search ................................. 370/319, 321, 370/324, 326, 329, 336, 337, 345, 347, 350, 395, 396, 398, 442, 447, 458, 461, 465, 468, 470, 471

[56] References Cited

U.S. PATENT DOCUMENTS

| | | | |
|---|---|---|---|
| 4,763,322 | 8/1988 | Eizenhofer | 370/337 |
| 4,862,453 | 8/1989 | West et al. | 370/314 |
| 5,065,398 | 11/1991 | Takashima | 370/94.1 |
| 5,185,737 | 2/1993 | Nassehi et al. | 370/449 |
| 5,369,637 | 11/1994 | Richardson et al. | 370/281 |
| 5,570,362 | 10/1996 | Nishimura | 370/60.1 |
| 5,590,131 | 12/1996 | Kabatepe | 370/461 |
| 5,644,576 | 7/1997 | Bauchot et al. | 370/437 |
| 5,648,958 | 7/1997 | Counterman | 370/458 |

FOREIGN PATENT DOCUMENTS

| | | |
|---|---|---|
| 63-197148 | 8/1988 | Japan . |
| 63-318843 | 12/1988 | Japan . |

*Primary Examiner*—Alpus H. Hsu
*Assistant Examiner*—Kwang B. Yao

[57] ABSTRACT

A telecommunications system capable of transmitting an N byte packet over a common communications channel by: temporally dividing the common communications channel into time slots that have a duration equal to $$\frac{\left\lceil \frac{N}{i} \right\rceil + C}{R}$$

seconds, where i is a natural number greater than one, C is a constant and R is the transmission rate of the common communications channel in bytes per second; splitting the N byte packet into i p-packets; preparing an M byte training sequence; and transmitting the M byte training sequence and the p-packets over the common communications channel in consecutive time slots.

19 Claims, 4 Drawing Sheets

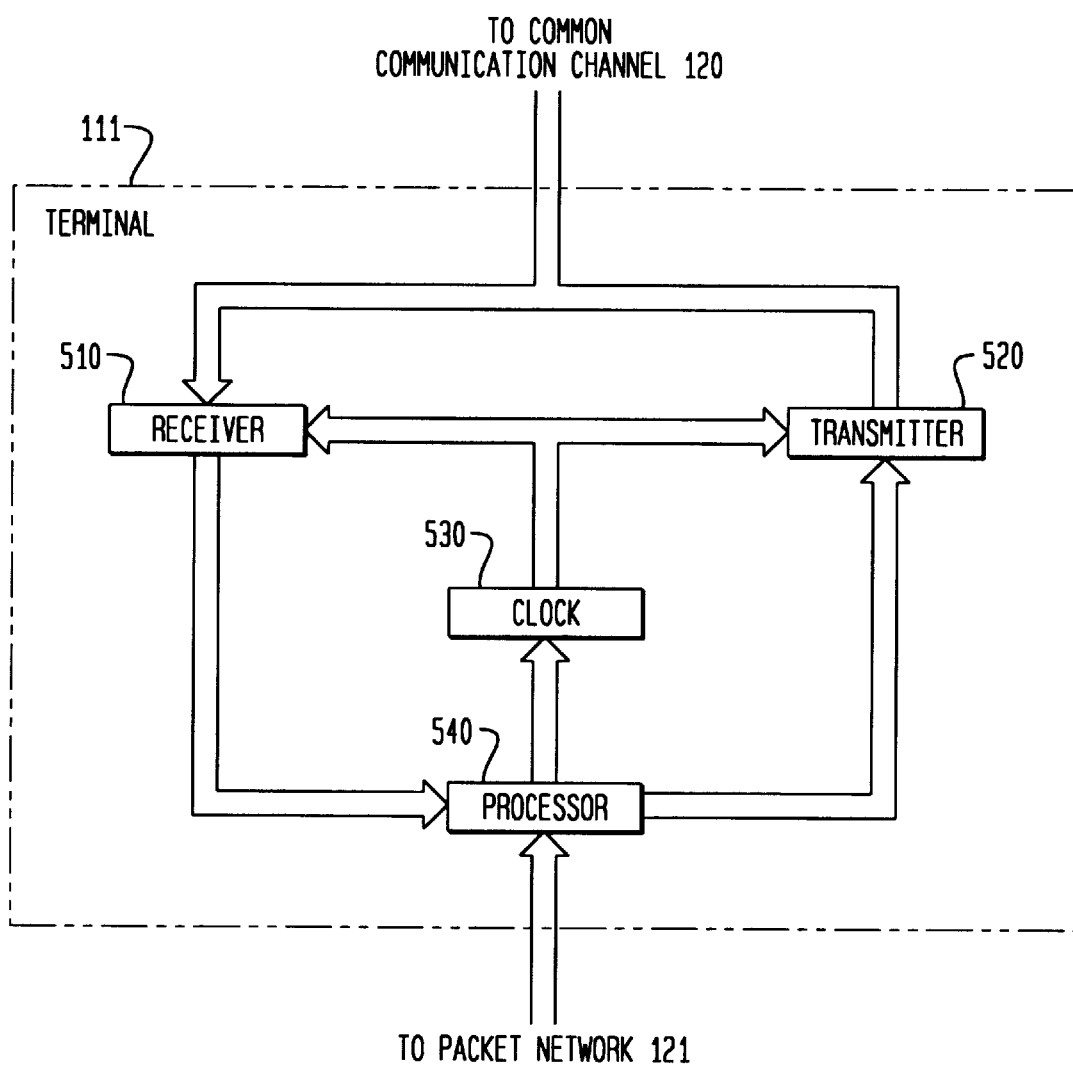

METHOD AND APPARATUS FOR TRANSMITTING PACKETIZED DATA OVER A COMMON COMMUNICATIONS CHANNEL

FIELD OF THE INVENTION

The present invention relates to telecommunications in general, and, more particularly, to a method and apparatus for transmitting packetized data over a common communications channel.

BACKGROUND OF THE INVENTION

In telecommunications systems that have a point-to-point topology (e.g., leased telephone lines, microwave radio), the entire bandwidth of the communications channel is available to a single terminal without its having to contend for access to the channel with other terminals. In contrast, in telecommunications systems that have a point-to-multipoint topology (e.g., broadcast radio, shared channel wireline networks) the common communications channel is shared by multiple terminals, each of which must contend with other terminals for access to the bandwidth of the channel.

Given the characteristics of shared transmission medium networks, a number of techniques, called "multi access layer protocols," have been developed to resolve the contention issue and to ensure the efficient utilization of the bandwidth of the common communications channel.

SUMMARY OF THE INVENTION

Embodiments of the present invention are capable of transmitting packetized data over a common communications channel without many of the costs and restrictions associated with prior techniques. For example, when the packetized data requires training sequences whose length varies from transmitter to transmitter, and/or from a single transmitter over time, embodiments of the present invention are capable of efficiently using the bandwidth of the common communications channel with a relatively simple multiple access layer protocol.

An illustrative embodiment of the present invention is capable of transmitting an N byte packet over a common communications channel by: temporally dividing the common communications channel into time slots that have a duration equal to $$\frac{\left[\frac{N}{i}\right] + C}{R}$$

seconds, where i is a natural number greater than one, C is a constant and R is the transmission rate of the common communications channel in bytes per second; splitting the N byte packet into i p-packets; preparing an M byte training sequence; and transmitting the M byte training sequence and the p-packets over the common communications channel in consecutive time slots.

BRIEF DESCRIPTION OF THE DRAWINGS

FIG. 5 depicts a block diagram of a hardware embodiment of the present invention.

DETAILED DESCRIPTION

Figure 1:
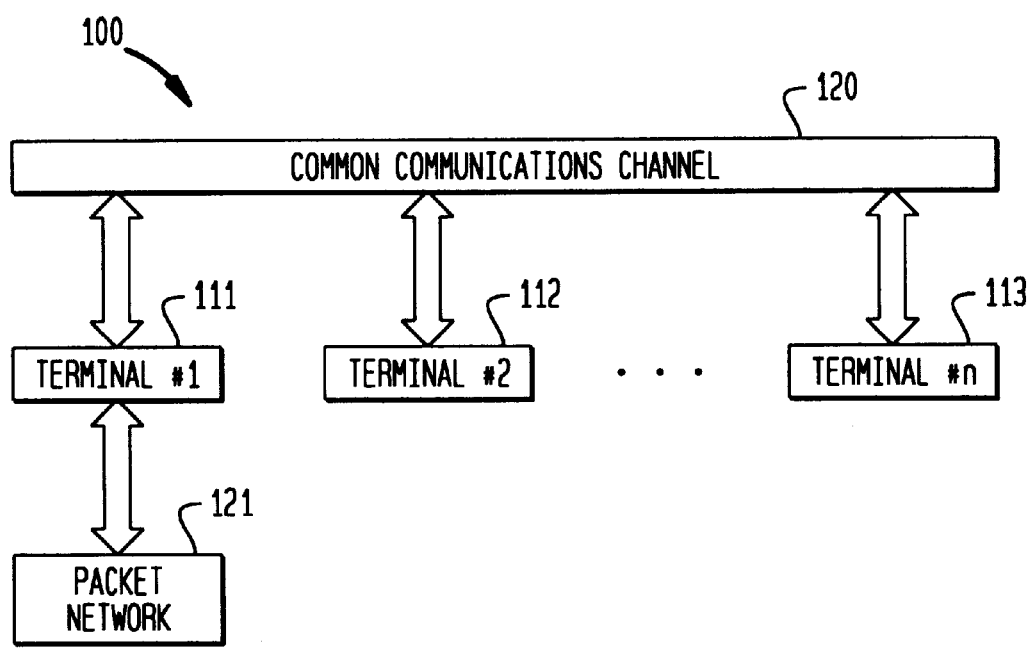
FIG. 1 depicts a digital telecommunications system that transmits packetized data among a plurality of terminals.

FIG. 1 depicts an illustrative embodiment of the present invention in which digital telecommunications system 100 transmits packetized data among a plurality of terminals (e.g., terminal 111, terminal 112, etc.) which share a common communications channel 120 under the regulation of a multiple access layer protocol. Digital telecommunications system 100 could be, for example, a wireless system in which common communications channel 120 is some portion of the electromagnetic spectrum. Furthermore, when digital telecommunications system 100 is a wireless system, the locations of some or all of the terminals can be mobile. For example, some of the terminals can be wireless terminals and others can be base stations that enable the wireless terminals to communicate with other wireless terminals and with the wireline network.

Alternatively, digital telecommunications system 100 could be a wireline system in which common communications channel 120 could be copper, optical fiber, coaxial cable or other wireline transmission medium or combination of the above.

One or more of the terminals in the illustrative embodiment could also be connected to a packet network, such as an ATM network. One of the terminals could be, for example, a wireless base station, or head-end equipment in a fiber-coax system.

Digital telecommunications system 100 requires that each terminal transmit an M byte training sequence prior to the transmission of a packet for the purposes of equalization and synchronization. The length of the training sequence varies from terminal to terminal and temporally and is based on, among other things, whether common communications channel 120 is wireless or wireline, whether the terminals are fixed or mobile, the modulation scheme used, the carrier frequency, the bit error rate of previous transmissions, and the weather and topology of the terrain near the terminals. Furthermore, at any given time, the length of the training sequence transmitted by one terminal can be different than the length of the training sequence transmitted by another. Typically, the length of the training sequence can range from just a few bytes to hundreds of bytes. It will be clear to those skilled in the art how to make and use training sequences for packetized data, and to determine the length of the training sequences.

In accordance with the illustrative embodiment, each terminal generates variable-length messages for transmission to other terminals via common communications channel 120, under the regulation of a multiple access layer protocol.

One possible protocol for regulating the use of common communications channel 120 could allow the transmission of a variable-length packet (following the transmission of a variable-length training sequence). Such a protocol tends to be complex and tends not to use the overall bandwidth capability of common communications channel 120 efficiently.

An alternative protocol could require that each terminal partition each message into one or more fixed-length packets of N bytes and utilize fixed-length time slots in which to transmit the fixed-length packets and the training sequences.

One or more fixed-length packets could be transmitted consecutively after a training sequence.

Generally, a protocol that uses time slots and fixed-length packets tends to be less complex and tends to use the common channel bandwidth more efficiently than a multiple access layer protocol that permits variable-length packets. If fixed-length packets and slots are to be used, then the questions arises: What should be the duration of the time slot in relation to the size of the fixed-length packet?

One solution is that the duration of the time-slot could be equal to the amount of time required to transmit some fixed multiple number of packets plus the amount of time required to transmit a typical training sequence. This solution is advantageous because the cost of the training sequence is amortized over multiple packets. This solution is disadvantageous in terms of delay-throughput, however, because the terminal may have to delay the transmission of one packet until enough packets are available to fill the time slot. Analogously, if the terminal cannot delay the transmission of packets for long and must transmit each packet soon after it becomes available for transmission, and without waiting for other packets for fill-out the time slot, then this solution will waste the bandwidth of the common channel because the terminal will be using a time slot intended for multiple time packets to transmit fewer packets than it was designed to carry.

Because the length of the training sequence varies over time, a second solution is to set the duration of the time-slot to equal the amount of time required to transmit one fixed-length packet, regardless of the length of any given training sequence or of the expected length of a typical training sequence. This solution is advantageous in terms of delay-throughput because the terminal does not need to wait for other packets in order to transmit a single packet. Furthermore, this solution is also advantageous in terms of efficiently using the bandwidth of the common channel because the terminal will never send a single packet in a time slot intended for multiple packets. This solution is, however, problematic given that the length of the training sequence varies over time.

When, however, the length of a training sequence is disregarded in determining the length of the time slot, the training sequence may not always fill an integral number of time slots, and, therefore, a time slot may be only partially filled, which wastes the bandwidth of common communications channel 120. Furthermore, the probability that a given training sequence will not fill an integral number of time slots increases with the size of the time slot. In other words, for a given training sequence, larger time slots are less likely to be integrally filled than smaller time slots, and, therefore, are more wasteful of the bandwidth of common communications channel 120.

Taking this understanding into account, the illustrative embodiment of the present invention partitions variable-length messages into one or more fixed-length packets and uses a time slot that is smaller than the amount of time required to transmit one fixed-length packet. More specifically, the length of the time slot is advantageously equal to an "approximate submultiple" of the amount of time required to transmit one fixed-length packet. This solution is advantageous in terms of delay-throughput because the terminal does not need to wait for other packets in order to transmit a single packet and is advantageous in terms of bandwidth utilization because the terminal will never send a single packet in a time slot for multiple packets, nor will it unduly waste bandwidth by transmitting a small training sequence in a long time slot.

For the purposes of this specification, the term "approximate submultiple" means the function $$\left\lceil \frac{N}{i} \right\rceil + C \qquad \text{(Eq. 1)}$$

where N is the length of the packet, i is a natural number greater than one, C is a constant and the ceiling function $f(x) = \lceil x \rceil$ means the smallest integer greater than or equal to x. For example, (for C=0) the approximate submultiples of 53 are 27, 18, 14, 11, 9, 8, 7, 6, 5, 4, 3, 2 and 1.

Figure 2:
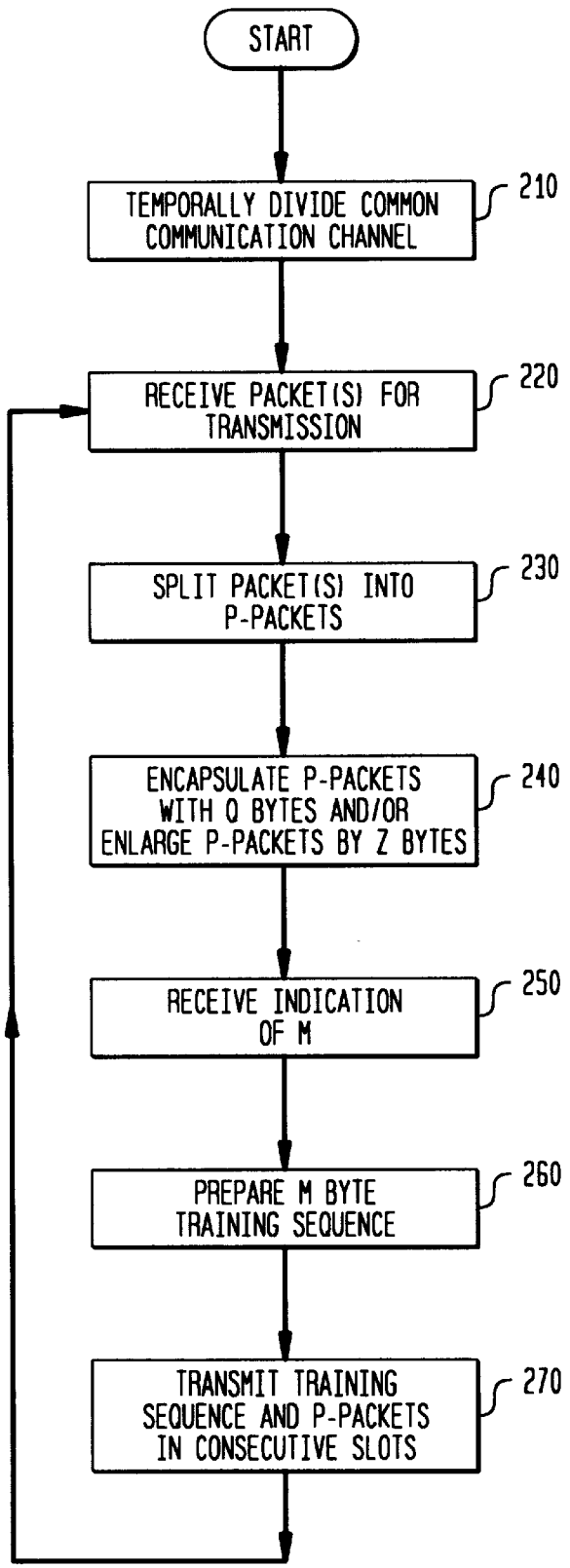
FIG. 2 depicts a flowchart of the operation of the illustrative embodiment of the present invention.
Figure 3:
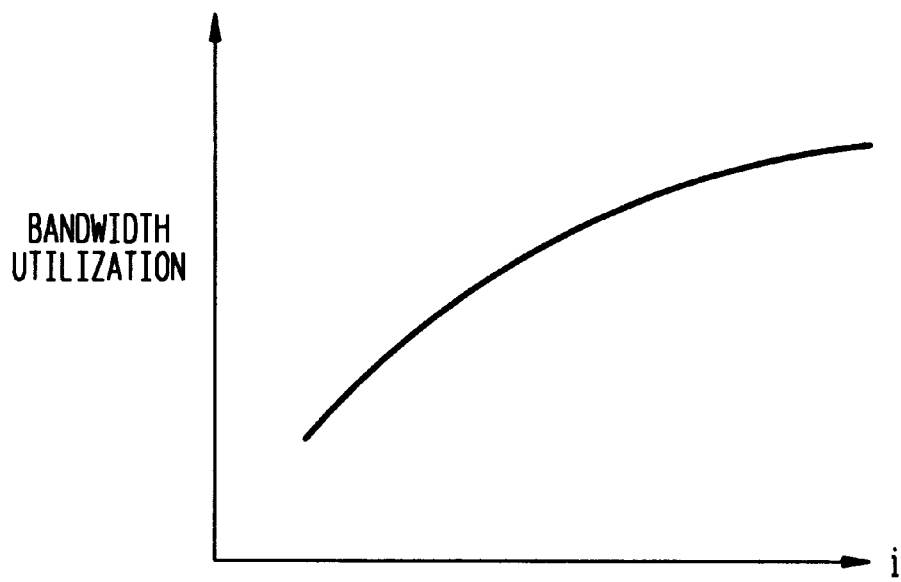
FIG. 3 depicts a graph that indicates how the transmission rate utilization of a common communications channel varies as a function of i.
Figure 4:
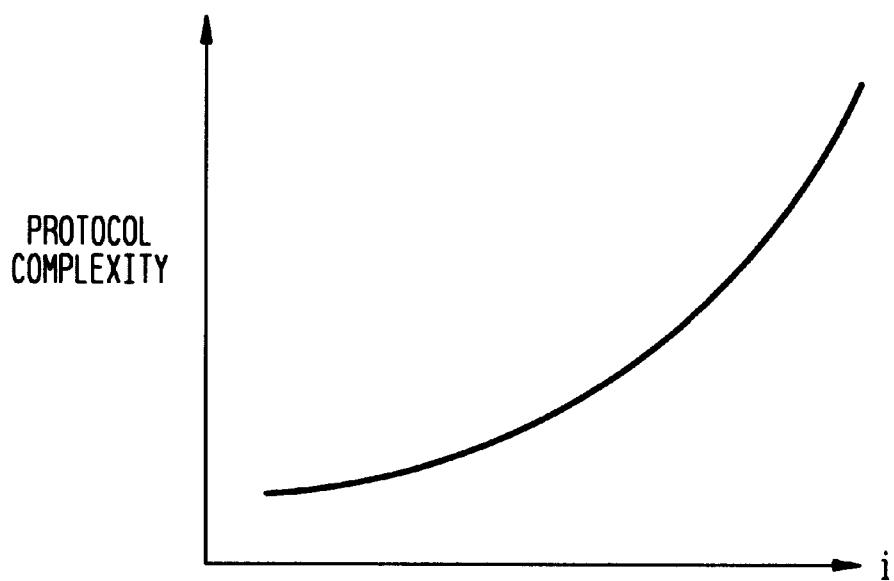
FIG. 4 depicts a graph that indicates how the protocol complexity of the illustrative embodiment varies as a function of i.

FIG. 2 depicts a flowchart of the operation of the illustrative embodiment as it transmits packetized data over common communications channel 120 (shown in FIG. 1). The method begins at step 210, which temporally divides common communications channel 120 into slots that have a duration equal to $$\frac{\left\lceil \frac{N}{i} \right\rceil + C}{R} \text{ seconds} \qquad \text{(Eq. 2)}$$

where N is length of the fixed-length packets, i is a natural number greater than one, C is a constant and R is the transmission rate of the common communications channel in bytes per second. The illustrative embodiment preferably operates on ATM cells, which are 53 bytes in length and, therefore, N=53. As shown in FIG. 3, the bandwidth utilization of the common channel tends to increase with larger values of i, but, as shown in FIG. 4, so does the complexity of the multiple access layer protocol and its task of regulating access to common communications channel 120. The specific value of i used in an illustrative embodiment of the present invention will depend, among other things, on the quantity and the nature of the traffic to be transmitted on common communications channel 120. Although values of i=2, 3 or 4 are believed to be typical, it will be clear to those skilled in the art how to choose a value of i for a specific embodiment to improve the bandwidth utilization of the embodiment without unduly complicating the complexity of the protocol. For purposes of the illustrative embodiment, i=3.

For pedagogical reasons, the description on determining a value for C will be postponed. The transmission rate R of common communications channel 120 is an empirical fact depending on the specific embodiment of the present invention and it will be clear to those skilled in the art how to determine the value for R.

Once values for N, i, C and R are determined, common communications channel 120 can be divided into temporal slots. Advantageously, one terminal or entity with access to common communications channel 120 transmits a pulse train on common communications channel 120 to the other terminals, which pulse train is either implicitly or explicitly indicative of the slot boundaries and so that all of the terminals are synchronized with regard to the slot boundaries. There need not be one pulse per slot, but at least one pulse periodically or sporadically so that all of the respective terminals can be re-synchronized with respect to the slot boundaries.

At step 220, the terminal receives one or more N byte fixed-length packets to be transmitted on common communications channel 120.

At step 230, the terminal splits the ATM cell into i parts, called "p-packets," each of which has a length of $$\left\lceil \frac{N}{i} \right\rceil + 1 \text{ bytes.} \quad (\text{Eq. 3.})$$

According to the illustrative embodiment, N=53 and i=3, and, therefore, each p-packet will have a length of 18 bytes. It should be noted that the three p-packets hold 54 bytes whereas the ATM cell only held 53 bytes. Any additional capacity that the p-packets have should be padded.

At step 240, each p-packet is encapsulated with Q bytes of encapsulation and/or is enlarged by Z bytes. The process of encapsulation leaves the contents of the p-packet untouched and adds Q bytes as a header to the p-packet, whereas, in contrast, the process of enlargement alters the contents of the p-packet in such a manner as to require Z more bytes to hold the information of the p-packet. Encapsulation can be done to enhance error correction and detection, to enhance p-packet boundaries, to insert sequence numbers, to insert control information (such as the size of the payload), etc. It will be clear to those skilled in the art how to encapsulate p-packets for a specific embodiment of the present invention.

Enlargement is typically performed for the purposes of error correction and detection and/or for cryptographic purposes. It will be clear to those skilled in the art how to enlarge p-packets for a specific embodiment of the present invention. P-packets can be encapsulated and the result enlarged and vice versa. Again, it will be clear to those skilled in the art how to perform both encapsulation and enlargement on a p-packet for a specific embodiment of the present invention. Alternatively, in some embodiments of the present invention, the p-packets are neither encapsulated nor enlarged. When the p-packets transmitted over common communications channel 120 are neither encapsulated nor enlarged, the value for C is advantageously zero (0). When the p-packets transmitted are encapsulated and/or enlarged, the value for C is advantageously Q+Z.

At step 250, the illustrative embodiment advantageously receives over common communications channel 120 an indication of how long the training sequences it should transmit should be. For example, the indication could be a number that explicitly indicates the length of the training sequence. Alternatively, the indication could be an implicit indicator that the last training sequence was too short and that the next should be longer, or that the last training sequence was too long and that the next should be shorter. The indication is advantageously transmitted by another terminal on common communications channel 120. It will be clear to those skilled in the art how to make and use a messaging system for indicating how long the training sequences should be.

At step 260, the illustrative embodiment prepares an M byte training sequence, in well known fashion.

At step 270, the illustrative embodiment transmits the M byte training sequence and the (possibly encapsulated) p-packets in consecutive slots, beginning at a slot boundary, under the regulation of the multiple access layer protocol. Any remaining portion of a time slot is padded, in well known fashion. After step 270, the illustrative embodiment proceeds to step 220.

FIG. 5 depicts a block diagram of a hardware embodiment of the present invention. Clock 530 is advantageously a highly precise clock whose frequency and phase are set by processor 540, in well known fashion, and whose output is used by both receiver 510 and transmitter 520 for determining when time slots begin and end. If terminal 111 sets the standard time slot frequency and phase for all of the terminals on common communications channel 120, then transmitter 520 is advantageously capable of transmitting the pulse train from clock to other terminals. Processor 540 is used for transmitting and receiving packetized data from packet network 121, for splitting packets into p-packets, for encapsulating and/or enlarging the p-packets, for unencapsulating and/or de-enlarging p-packets received over common communications channel 120 and for rejoining p-packets into fixed-length packets, all in well-known fashion. Receiver 510 receives p-packets, messages indicative of M, and when terminal 111 is not setting the standard time slot, the pulse train from another terminal over common communications channel 120

What is claimed is:

1. A method of transmitting an N byte packet over a common communications channel, where N is a natural number, comprising:

temporally dividing said common communications channel into time slots that have a duration equal to $$\frac{\left\lceil \frac{N}{i} \right\rceil + C}{R}$$

seconds, where i is a natural number greater than one, C is a constant and R is the transmission rate of said common communications channel in bytes per second;

splitting said N byte packet into i p-packets;

preparing an M byte training sequence, where M is a natural number; and transmitting said M byte training sequence and said p-packets over said common communications channel in consecutive time slots.

2. The method of claim 1 wherein C equals 0, N equals 53 and i equals 2.

3. The method of claim 1 wherein C equals 0, N equals 53 and i equals 3.

4. The method of claim 1 further comprising the step of encapsulating each of said p-packets with Q bytes prior to said step of transmitting, wherein Q is a natural number.

5. The method of claim 4 wherein C is based on Q.

6. The method of claim 1 further comprising the step of enlarging each of said p-packets by Z bytes prior to said step of transmitting, wherein Z is a natural number.

7. The method of claim 6 wherein C is based on Z.

8. The method of claim 1 further comprising the step of encapsulating each of said p-packets with Q bytes and enlarging each of said p-packets by Z bytes prior to said step of transmitting.

9. The method of claim 8 wherein C is based on Q and Z.

10. The method of claim 1 further comprising the step of receiving a message indicative of M prior to said step of preparing an M byte training sequence.

11. The method of claim 10 wherein the value of M varies over time.

12. A terminal for transmitting an N byte packet over a common communications channel, wherein N is a natural number, said terminal comprising:

a clock for transmitting a pulse train that temporally divides said common communications channel into time slots that have a duration equal to $$\frac{\left\lceil \frac{N}{i} \right\rceil + C}{R}$$

seconds, where i is a natural number greater than one, C is a constant and R is the transmission rate of said common communications channel in bytes per second;

a processor for splitting said N byte packet into i p-packets and for preparing an M byte training sequence; and a transmitter for receiving said pulse train and for transmitting said M byte training sequence, where M is a natural number, and said p-packets over said common communications channel in consecutive time slots.

13. The terminal of claim 12 wherein said common communications channel is a wireline channel.

14. The terminal of claim 12 wherein said common communications channel is a portion of the electromagnetic spectrum.

15. The terminal of claim 12 further comprising a receiver for receiving a message indicative of M.

16. The terminal of claim 12 further comprising an encapsulator for encapsulating each p-packet with Q bytes prior to transmission, wherein Q is a natural number.

17. The terminal of claim 16 wherein C is based on Q, N equals 53 and i equals 3.

18. The terminal of claim 12 further comprising an enlarger for enlarging each p-packet by Z bytes prior to transmission, wherein Z is a natural number.

19. The terminal of claim 18 wherein C is based on Z, N equals 53 and i equals 3.

* * * * *